Nov. 6, 1951        M. J. UPDEGRAFF        2,574,072
CAMERA-PROJECTOR LENS SUPPORTING ATTACHMENT
Filed Nov. 21, 1947
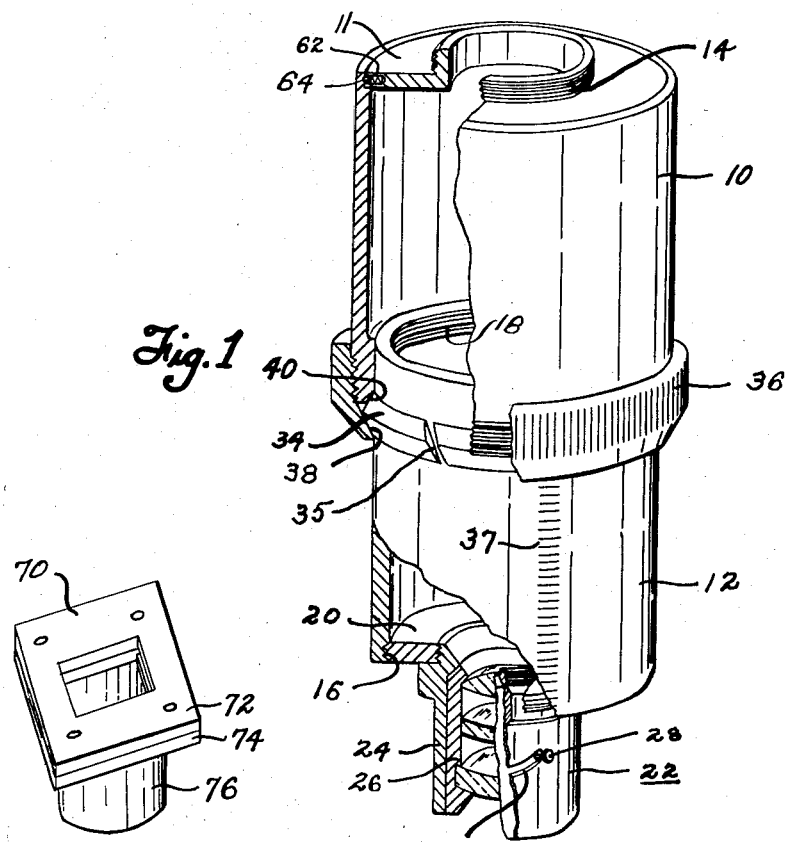
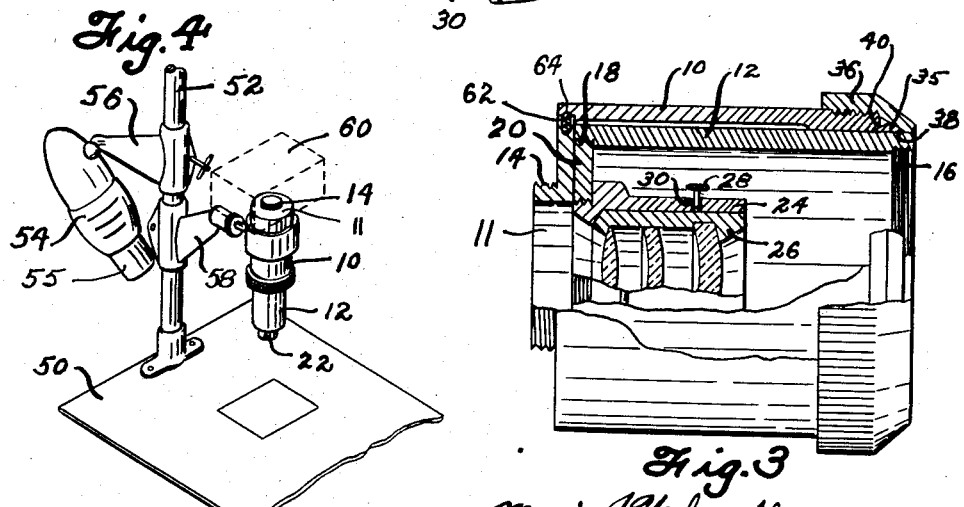
Mervin J. Updegraff, INVENTOR.
BY Dybvig & Dybvig,
His Attorneys.

Patented Nov. 6, 1951

2,574,072

UNITED STATES PATENT OFFICE 2,574,072

CAMERA-PROJECTOR LENS SUPPORTING ATTACHMENT

Mervin J. Updegraff, Dayton, Ohio

Application November 21, 1947, Serial No. 787,397

12 Claims. (Cl. 88—57)

This invention relates to a lens supporting attachment for a camera and more particularly to an improved and inexpensive lens extension tube for use with miniature cameras and the like.

It is an object of this invention to provide a lens extension tube which makes it possible to expertly photograph subjects that lie within the close-up field of less than the usual three foot limitation of focus adjustments on most cameras.

Another object of this invention is to provide a lens supporting attachment in which the lens may be adjusted from the minimum possible extension easily and quickly to the maximum with practically unlimited focusing adjustment so as to obtain exactly the composition or magnification of image one wants.

A further object of this invention is to provide a telescoping lens supporting tube in which friction is applied as desired to the telescoping section and in which the means for applying the friction may be used for locking the telescoping tube in any desired degree of extension.

Still another object of this invention is to provide a lens supporting attachment which may be used to convert a standard camera into a photo enlarger without destroying the utility of the camera for picture taking purposes.

Further objects and advantages of the present invention reside in the construction and combination of parts and in the mode of operation as will be apparent from the following description, references being had to the accompanying drawings wherein a preferred form of the present invention is clearly shown.

In the drawings:

Figure 1 is a pictorial view, with parts broken away, showing a preferred form of lens supporting attachment;

Figure 2 is a pictorial view showing one application for a lens supporting attachment constructed in accordance with my invention;

Figure 3 is a sectional view of the attachment showing the camera lens supported at a point so as to be close to the lens opening of the camera; and Figure 4 is a pictorial view of an adapter for use with the lens supporting attachment.

The lens supporting attachment illustrated in the drawings has been designed to increase the utility of standard cameras and particularly miniature cameras and to make it possible for camera fans to enjoy the increased utility without the necessity of spending much money. For purposes of illustration, I have shown a tube designed for use with a two inch lens which is standard on nearly all miniature cameras although it is obvious that the invention is equally applicable to other lens sizes and other types of cameras. The lens of the average miniature camera has far more utility than most persons realize. Not only are they fast, but highly corrected, possessing unusual depth of field at relative apertures, and capable of sharpness of focus almost beyond comprehension, with resolving power to a circle of confusion of approximately $1/200$ inch in less expensive lenses, and to perhaps $1/2000$ inch in higher grade lenses. The lens attachment described herein is designed to take maximum advantage of the capabilities of such lenses so as to greatly enlarge the utility of the ordinary camera. Thus the attachment makes it possible to use an ordinary camera to do close-up table top photography, microphotograph and photomicrographs, copy all manner of pictures, drawings, maps, documents, take pictures of material textures, flowers, flies, insects and myriad other subjects from nature.

Referring now to Figure 1 of the drawings wherein I have shown a preferred form of my invention, reference numerals 10 and 12 designate inner and outer telescoping tubes wherein the outer tube 10 is provided with a removable end piece 11 having a threaded portion 14 which is adapted to fit the threaded lens supporting aperture of a standard camera. The inner tube 12 is slidably supported within the outer tube 10 as illustrated. The inner tube 12 is provided with internal threaded portions 16 and 18 either portion of which is adapted to cooperate with a lens supporting ring 20. As shown in the drawing, the ring 20 is provided with external threads complementary to the threaded portions 16 and 18 provided on the tube 12 as shown. The ring 20 in turn is provided with internal threads which cooperate with complementary threads on the standard lens holder 22.

For purposes of illustration, I have shown a simplified form of lens holder which comprises an outer member 24 and a slidable inner lens mounting member 26 which telescopes within the member 24. The lens assembly 22 is intended to represent a conventional lens assembly of the type which comes as standard equipment on many cameras. In order to simplify this disclosure, the details of the lens assembly have not been shown. Thus the lens assembly of a Leica camera, for example, includes a large number of parts including means for adjusting the lens aperture as well as means for adjusting the focus. Reference numeral 28 designates means for adjusting the position of the member 26 relative to the member 24. Thus, by moving the pin 28 within the angularly arranged slot 30 the focus of the lens assembly may be adjusted a small amount. The focusing made possible by moving the pin 28 within the slot 30 merely represents the standard focusing adjustment of a miniature camera lens and it is obvious that such adjustment of the focus is not enough to enable the average camera to be used for taking pictures of subjects within the close-up field of less than the usual three foot limitation of focus.

In order to apply the desired amount of friction to movement of the inner tube 12 within the outer tube 10, I have provided a split cam ring or friction element 34 constructed as shown which frictionally engages the outer surface of the tube 12. The frictional resistance to relative movement between the tube 12 and the ring 34 may be adjusted by the screw threaded nut 36 which cooperates with external threads provided on the outer tube 10 as shown. The nut 36 is provided with a cam surface 38 which serves to cam the ring into firm engagement with the tube 12 when the threaded nut 36 is tightened. The outer end of the tube 10 is beveled at 40 so as to provide a cam surface for engagement with a portion of the outer surface of the split ring 34. The ring 34 is split diagonally at 35 so as to reduce the likelihood of light leaking into the tubes through the gap between the ends of the split ring. By virtue of the above described arrangement, it is obvious that it is possible to virtually lock the inner tube 12 in a fixed position relative to the outer tube 10 merely by tightening the nut 36.

In Figure 1 of the drawing, I have shown the lens supporting assembly 22 mounted in such a manner as to cause the lens to occupy a position a considerable distance away from the original lens supporting aperture of the camera whereas in Figure 3 of the drawing, I have shown the lens supporting assembly 22 mounted directly within tube 12 so as to occupy a position very near its original position. It is obvious that the above described mechanism provides almost infinite focusing adjustment of the lens so as to vary materially increase the utility of a conventional camera. Thus a portion of the adjustment may be made by means of the standard lens supporting assembly 22 and a much greater adjustment may be made by telescoping the inner tube 12 relative to the outer tube 10 or by shifting the lens mounting ring 20 from one end of the tube 12 to the other end of the tube 12. Since the position of the tube 12 may be predetermined for the critical focus of a given lens, the tube 12 is preferably provided with a focusing scale 37 for use in taking pictures or making enlargements with the aid of my lens supporting attachment. No numbers have been shown adjacent the scale 37 as these would be different for different lens and camera combinations. While I have shown only one scale, it is within the purview of this invention to provide several scales on each device for several of the most popular cameras so as to eliminate the necessity for making up several different attachments each having a different scale.

In Figure 2 of the drawing, I have shown a convenient arrangement for converting a standard camera into one for use in table top photography. Thus reference numeral 50 designates a table to which there is attached a vertical fixture supporting post 52. Reference numeral 54 designates a light carried by a bracket 56 which is adjustably mounted on the post 52. Reference numeral 58 designates a second adjustable bracket which is adapted to support the outer tube 10 of the lens supporting attachment in any desired position relative to the table 50. The bracket 58 allows vertical adjustment as well as tilting of the tube relative to the vertical axis of the post 52. Reference numeral 60 designates a conventional camera in which the lens has been transferred from its usual mounting to the lower end of the tube 12 and in which the tube 10 and its associated parts have replaced the lens in the camera. The above described arrangement is also suitable for use in making enlargements. The light or lamp 54 is capable of swinging around and above an opened camera for use in enlarging.

In Figure 4 of the drawing, I have shown a perspective view of a multiple purpose attachment 70 which may serve the purpose of an image viewer or as a film holder to be used while making enlargements or while doing trick photography. The attachment 70 comprises a pair of conventional separable plates 72 and 74 between which a negative or ground glass may be supported in accordance with practice which is now well known. The plate 74 is attached to a cylindrical member 76 which is adapted to be slidable on to the upper end of the tube 10 or on to the end piece 55 of the lamp unit 54. In referring to Figure 2, it will be noted that the outer diameter of the tube 10 is the same as the outer diameter of the end portion 55 of the lamp unit 54 whereby it is possible to interchangeably support the atachment 70 either on the upper end of the tube 10 or the outer end 55 of the lamp unit 54 merely by sliding the attachment in place on one or the other.

The apparatus disclosed herein is particularly adaptable for use in trick photography in that it makes it possible to support a film or a series of films adjacent the lamp unit and to project the image or images on to a negative mounted in a conventional camera placed adjacent the attachment 70. The unit 70 may also be used for supporting a film adjacent the upper end of the tube 10 when it is desired to make enlargements.

In order to facilitate interchanging the camera and the attachment 70 without wasting time, the end piece 11 is made separate from the outer tube 10 and may be removed from the tube 10 by merely exerting a pull on the piece 11 or the camera to which the piece 11 may be attached. The end piece 11 is releasably held in place on the tube 10 by means of one or more spring pressed balls 62 carried by the piece 11 which frictionally engage within the circumferential groove 64 provided in the inner surface of the tube 10. The groove is so placed as to cause the end piece 11 to be held tightly against the end of the ledge provided on the tube 10. This prevents light leakage at the joint between the end piece 11 and the tube 10. By virtue of this arrangement for attaching the end piece 11 relative to the tube, it is possible to rotate the end piece 11 and the camera or other attachment carried by the end piece relative to the tube sections 10 and 12. This is a real convenience in correction of distortion in the negative image.

While the form of embodiment of the invention as herein disclosed, constitutes a preferred form, it is to be understood that other forms might be adopted, all coming within the scope of the claims which follow.

Having thus described my invention, I claim:

1. In combination, a camera having a threaded aperture adapted to receive a lens assembly, a lens extension assembly supported within said aperture, said lens extension assembly comprising a first tube having a threaded portion mounted within said threaded aperture, a second tube telescoped within said first tube and slidable lengthwise therein, adjustable friction means for holding the tubes in the desired telescopic adjustment, said second tube having lens supporting and focusing means carried thereby, a lens carried by said last named means, said lens supporting means comprising means for supporting said lens at either end of said second tube.

2. A lens supporting attachment adapted for use with a miniature type of camera, or the like, comprising in combination, a first tube having means for attaching said tube to the lens holder of a camera, a second tube telescoped within said first tube and slidable lengthwise therein, adjustable friction means for holding said tubes in adjusted relationship, said second tube having a lens supporting ring carried thereby, said lens supporting ring comprising means for interchangeably supporting a lens adjacent either end of said second tube, said second tube being reversible end for end within said first tube.

3. A lens extension tube assembly adapted for use with a miniature type of camera, or the like, comprising in combination, a first tube having means for attaching said tube to the lens holder of a camera, a second tube telescoped within said first tube, adjustable friction means for holding said tubes in assembled relationship, a lens supporting ring, a lens carried by said ring, said lens supporting ring and said second tube comprising means for interchangeably supporting said lens adjacent either end of said second tube, said adjustable friction means comprising a split ring surrounding said second tube and a cam ring threaded to said first tube and having a cam surface for compressing said split ring into varying frictional engagement with the outer surface of said second tube to obtain satisfactory sliding pressure, or lock in a given position.

4. A lens extension tube assembly adapted for use with a miniature type of camera or the like comprising in combination, a first tube having means for attaching said tube to the lens holder of a camera, a second tube telescoped within said first tube, adjustable friction means for holding said tubes in assembled relationship, a lens supporting ring, a lens assembly including a lens carried by said ring, said lens supporting ring and said second tube comprising means for interchangeably supporting said lens adjacent either end of said second tube, said adjustable friction means comprising a split ring surrounding said second tube and a cam ring carried by said first tube and having a cam surface for forcing said split ring into varying frictional engagement with the outer surface of said second tube, said split ring being split along a diagonal line.

5. A lens extension tube assembly for use with a camera having a lens holder comprising in combination, a first tube having means for attaching said tube to the lens holder of a camera, a second tube telescoped within said first tube, adjustable friction means for holding said tubes in assembled relationship, said second tube having a lens supporting ring carried thereby, said lens supporting ring and said second tube comprising means for interchangeably supporting said lens adjacent either end of said second tube, said adjustable friction means comprising a split ring surrounding said second tube and a nut threaded to said first tube and having a surface for forcing said split ring against the one end of said first tube, said first tube having a beveled surface arranged to cam said split ring into varying frictional engagement with said second tube as said nut is tightened.

6. A lens extension tube assembly for converting a standard camera to use in close-up photography comprising a first tube having a threaded portion adapted to be inserted into the lens aperture of a camera, a second tube telescopically mounted within said first tube, said second tube having internal threaded portions arranged adjacent each end thereof, an adapter ring having external threads arranged to cooperate with either one of said internal threaded portions, said adapter ring having a central threaded aperture, a lens assembly supported within the central threaded aperture of said adapter ring, said lens assembly comprising an outer tubular member and an inner tubular member slidably mounted within said outer tubular member and lens means supported within said inner tubular member.

7. A lens supporting attachment adapted for use with a miniature type of camera, or the like, comprising in combination, a first tube having means for attaching said tube to the lens holder of a camera, a second tube telescoped within said first tube, adjustable friction means for holding said tubes in assembled relationship, said second tube having a lens supporting ring carried thereby, said lens supporting ring comprising means for interchangeably supporting a lens adjacent either end of said second tube, said means for attaching said first tube to the lens holder of a camera being separable from said first tube, and means for releasably securing said means for attaching said tube to the lens holder of a camera to said first tube, said last named means comprising a ball and socket type of detent means.

8. A lens extension tube assembly for converting a standard camera to use in close-up photography comprising a first tube having a threaded portion adapted to be inserted into the lens aperture of a camera, a second tube telescopically mounted within said first tube and slidable lengthwise therein, said second tube having an internal threaded portion arranged adjacent one end thereof, and an adapter ring having external threads arranged to cooperate with said internal threaded portion, said adapter ring having a central threaded aperture adapted to support a lens assembly.

9. A lens extension tube assembly for converting a standard camera to use in close-up photography comprising a first tube having a threaded portion adapted to be inserted into the lens aperture of a camera, a second tube telescopically mounted within said first tube and slidable lengthwise therein, said second tube having an internal threaded portion arranged adjacent one end thereof, and an adapter ring having external threads arranged to cooperate with said internal threaded portion, said adapter ring having a central threaded aperture adapted to support a lens assembly, and means for facilitating repeatedly resetting said tubes in a given relative relationship.

10. A lens extension tube assembly for converting a standard camera to use in close-up photography comprising a first tube having a threaded portion adapted to be inserted into the lens aperture of a camera, a second tube telescopically mounted within said first tube and slidable lengthwise therein, said second tube having an internal threaded portion, an adapter ring having external threads arranged to cooperate with said internal threaded portion, said adapter ring having a central threaded aperture, a lens assembly supported within the central threaded aperture of said adapter ring, said lens assembly comprising an outer tubular member and an inner tubular member slidably mounted within said outer tubular member, and lens means supported within said inner tubular member.

11. In combination, a support, a light unit carried by said support, a lens holder, means for mounting said lens holder on said support, a film holder removably secured to said lens holder and rotatable relative to said lens holder, said light unit and said lens holder each having similar cylindrical projections adapted for interchangeably and rotatably supporting said film holder.

12. A lens extension tube assembly for converting a standard camera to use in close-up photography comprising a first tube having a portion adapted to be mounted adjacent the lens aperture of a camera, a second tube telescopically mounted within said first tube and slidable lengthwise therein, said second tube having an internal threaded portion arranged adjacent one end thereof, and an adapter ring having external threads arranged to cooperate with said internal threaded portion, said adapter ring having a central threaded aperture adapted to support a lens assembly.

MERVIN J. UPDEGRAFF.

REFERENCES CITED

The following references are of record in the file of this patent:

UNITED STATES PATENTS

| Number | Name | Date |
|---|---|---|
| 2,072,286 | Wellington | Mar. 2, 1937 |
| 2,117,231 | Trautmann | May 10, 1938 |
| 2,124,161 | Cook et al. | July 19, 1938 |
| 2,381,228 | Schmidt | Aug. 7, 1945 |
| 2,383,439 | Baer | Aug. 28, 1945 |
| 2,426,521 | Parker | Aug. 26, 1947 |